United States Patent
Kawai

(10) Patent No.: US 7,301,524 B2
(45) Date of Patent: Nov. 27, 2007

(54) ELECTROPHORETIC DISPLAY AND METHOD OF PRODUCING THE SAME

(75) Inventor: Hideyuki Kawai, Fujimi-machi (JP)

(73) Assignee: Seiko Epson Corporation, Tokyo (JP)

(*) Notice: Subject to any disclaimer, the term of this patent is extended or adjusted under 35 U.S.C. 154(b) by 336 days.

(21) Appl. No.: 10/462,589

(22) Filed: Jun. 17, 2003

(65) Prior Publication Data
US 2004/0017349 A1    Jan. 29, 2004

Related U.S. Application Data

(63) Continuation-in-part of application No. 09/674,679, filed as application No. PCT/JP00/01351 on Mar. 6, 2000, now Pat. No. 6,597,340.

(30) Foreign Application Priority Data
Mar. 5, 1999    (JP)    ............ 11-059351

(51) Int. Cl.
*G09G 3/34*    (2006.01)

(52) U.S. Cl. .............. 345/107; 345/89; 345/108; 345/204; 359/296

(58) Field of Classification Search ............. 345/107, 345/108, 89, 204; 359/296
See application file for complete search history.

(56) References Cited

U.S. PATENT DOCUMENTS

| | | | |
|---|---|---|---|
| 4,522,472 A | 6/1985 | Liebert et al. | |
| 4,648,956 A | 3/1987 | Marshall et al. | |
| 6,067,185 A | 5/2000 | Albert et al. | |
| 6,181,393 B1* | 1/2001 | Enomoto et al. | ............ 349/86 |
| 6,252,564 B1 | 6/2001 | Albert et al. | |
| 6,383,619 B1 | 5/2002 | Engler et al. | |
| 6,839,158 B2* | 1/2005 | Albert et al. | ............ 359/296 |
| 6,864,875 B2* | 3/2005 | Drzaic et al. | ............ 345/107 |

FOREIGN PATENT DOCUMENTS

| | | |
|---|---|---|
| JP | 6-486116 | 3/1989 |
| JP | 10-149118 A | 6/1998 |

* cited by examiner

*Primary Examiner*—Richard Hjerpe
*Assistant Examiner*—Leonid Shapiro
(74) *Attorney, Agent, or Firm*—Oliff & Berridge, PLC

(57) ABSTRACT

An electrophoretic display capable of improved contrast. A back substrate 52 provided with a transparent electrode 54 and a transparent substrate 53 provided with transparent electrodes $55_1$ to $55_3$ are arranged at a predetermined distance D. Between the transparent substrate 53 and the back substrate 52 are arranged a large number of microcapsules. In each of the microcapsules 56A is sealed a dispersion comprised of electrophoretic particles 57 dispersed in a dispersion medium 61 in advance by the microcapsulation technique. The plurality of microcapsules 56A are sandwiched between the transparent substrate 53 and the back substrate 52. The display surface side and the back side thereof are flat in shape.

7 Claims, 8 Drawing Sheets

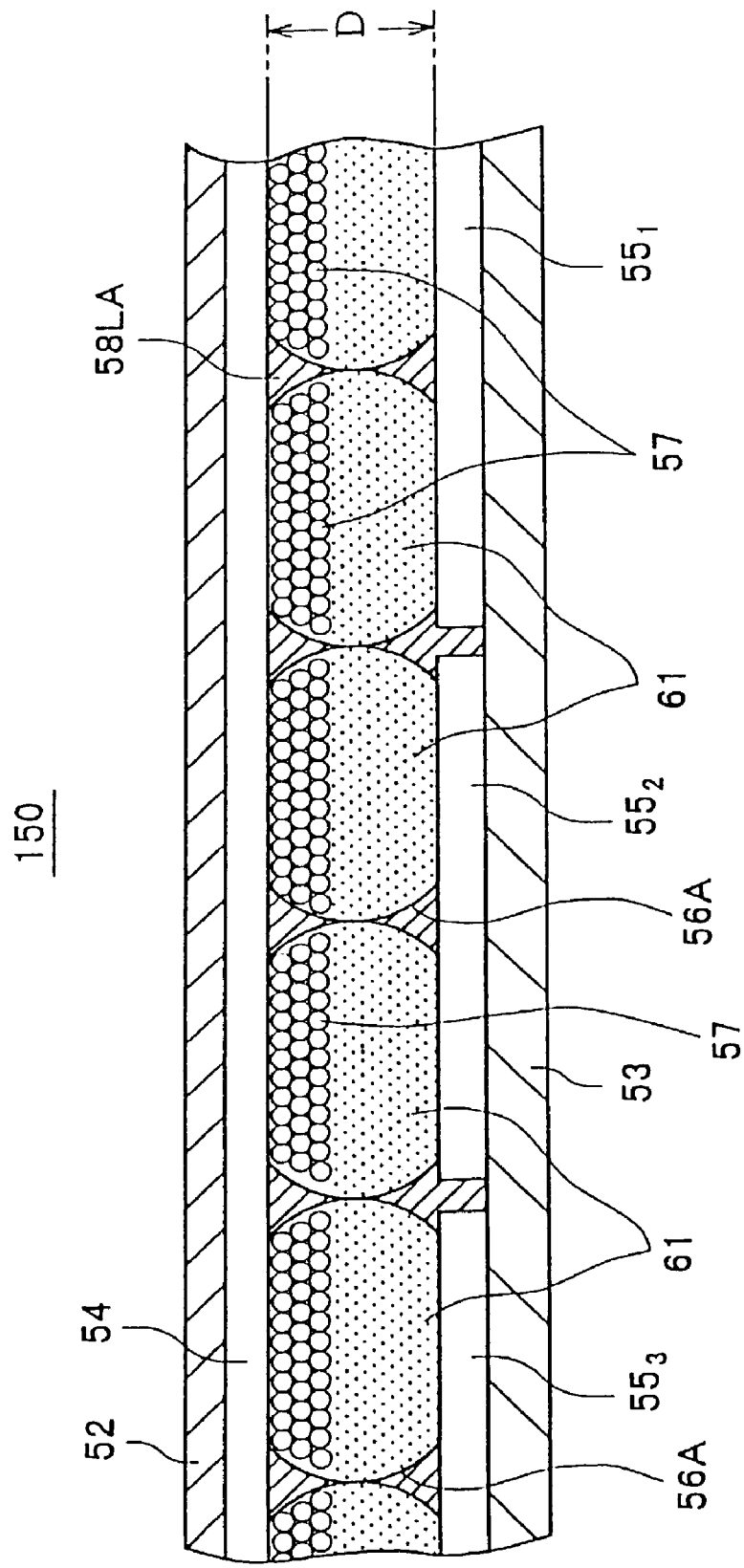

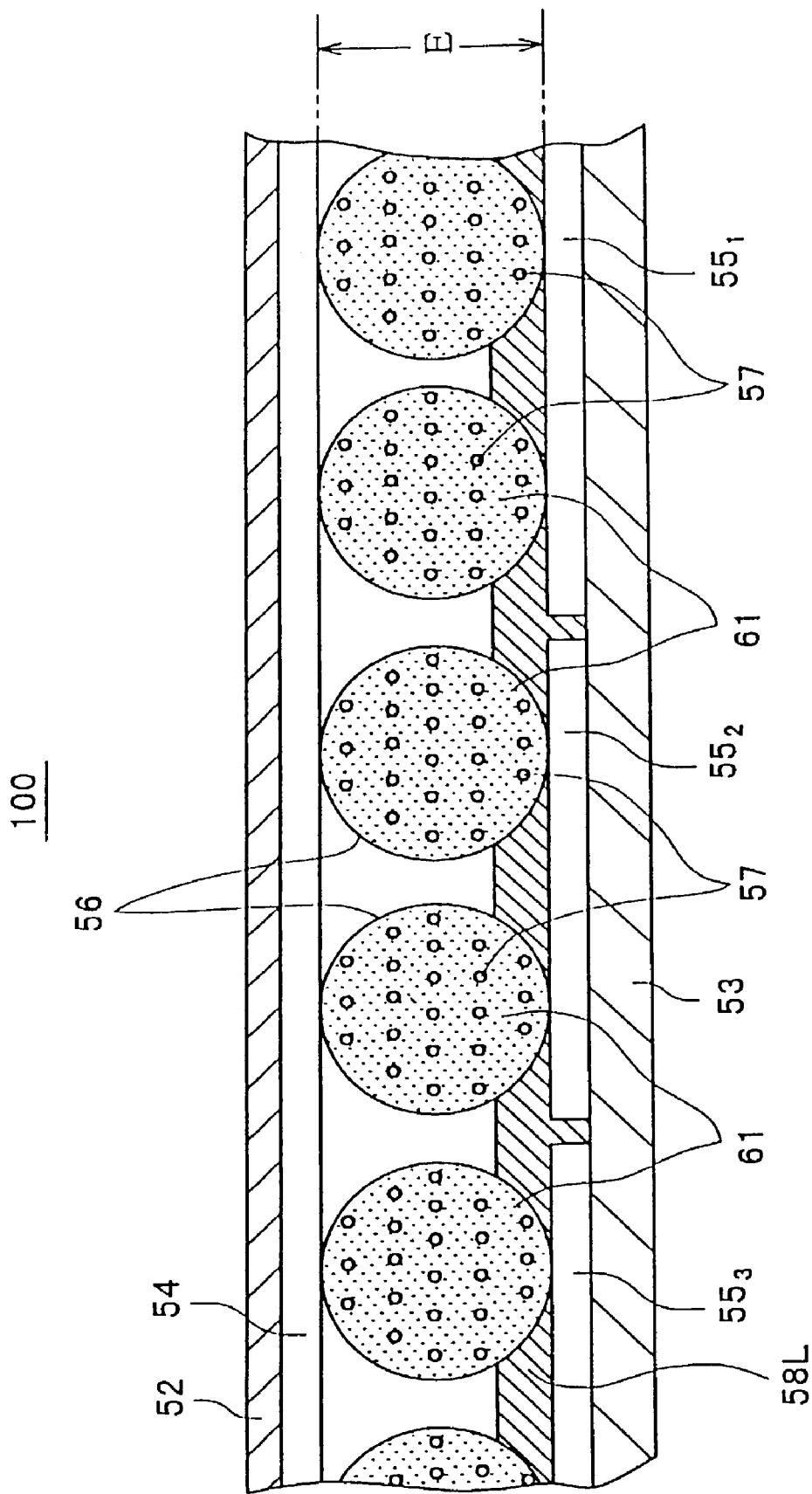

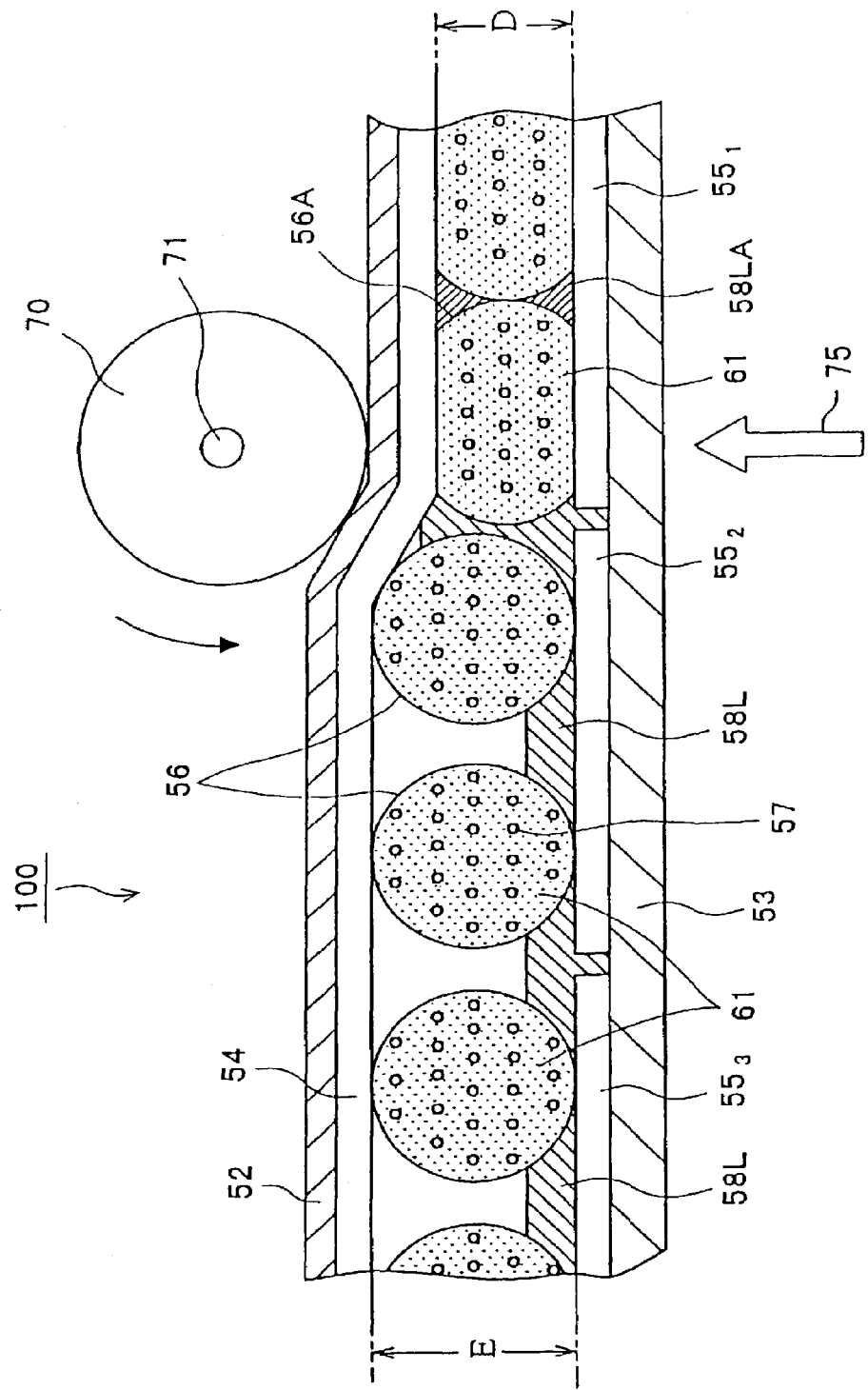

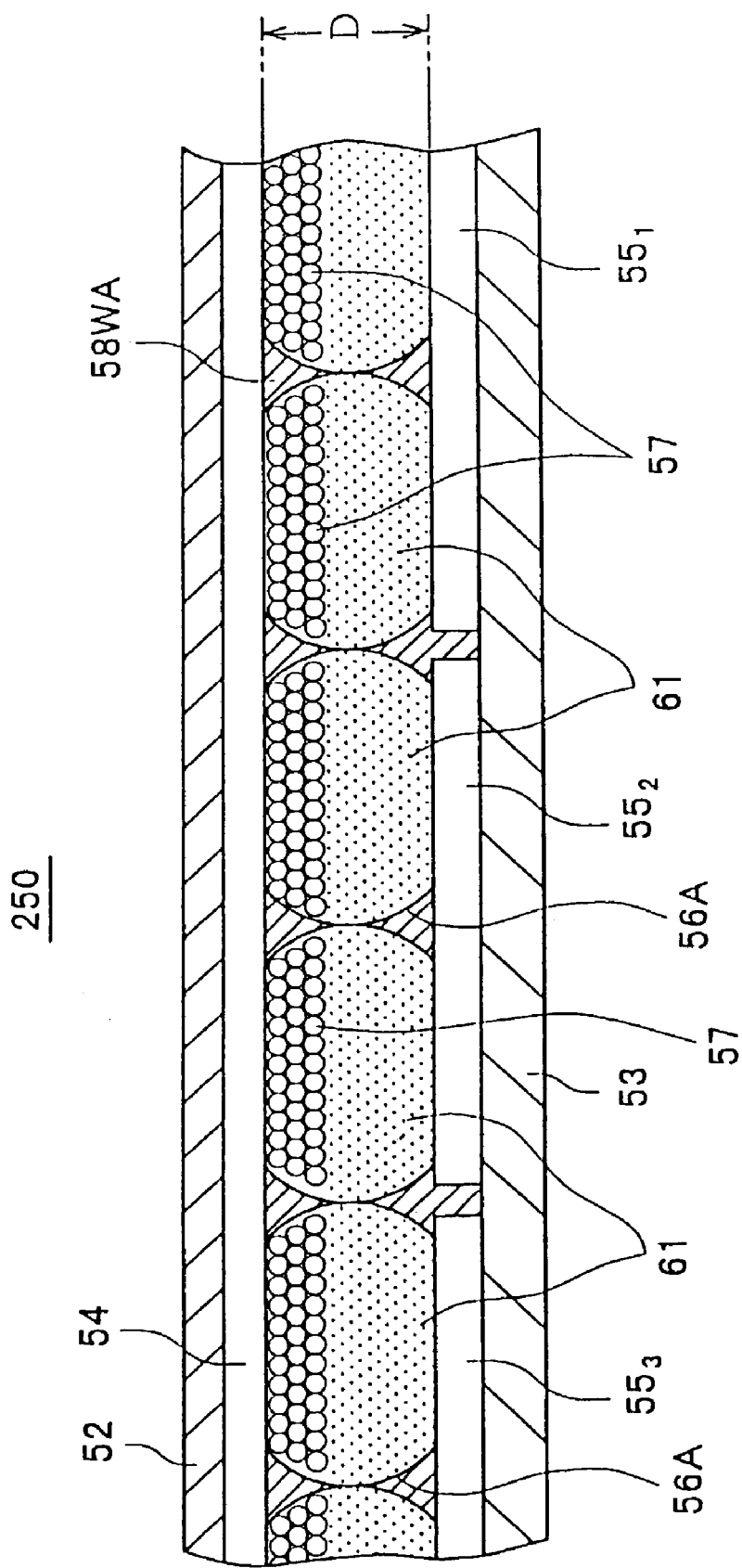

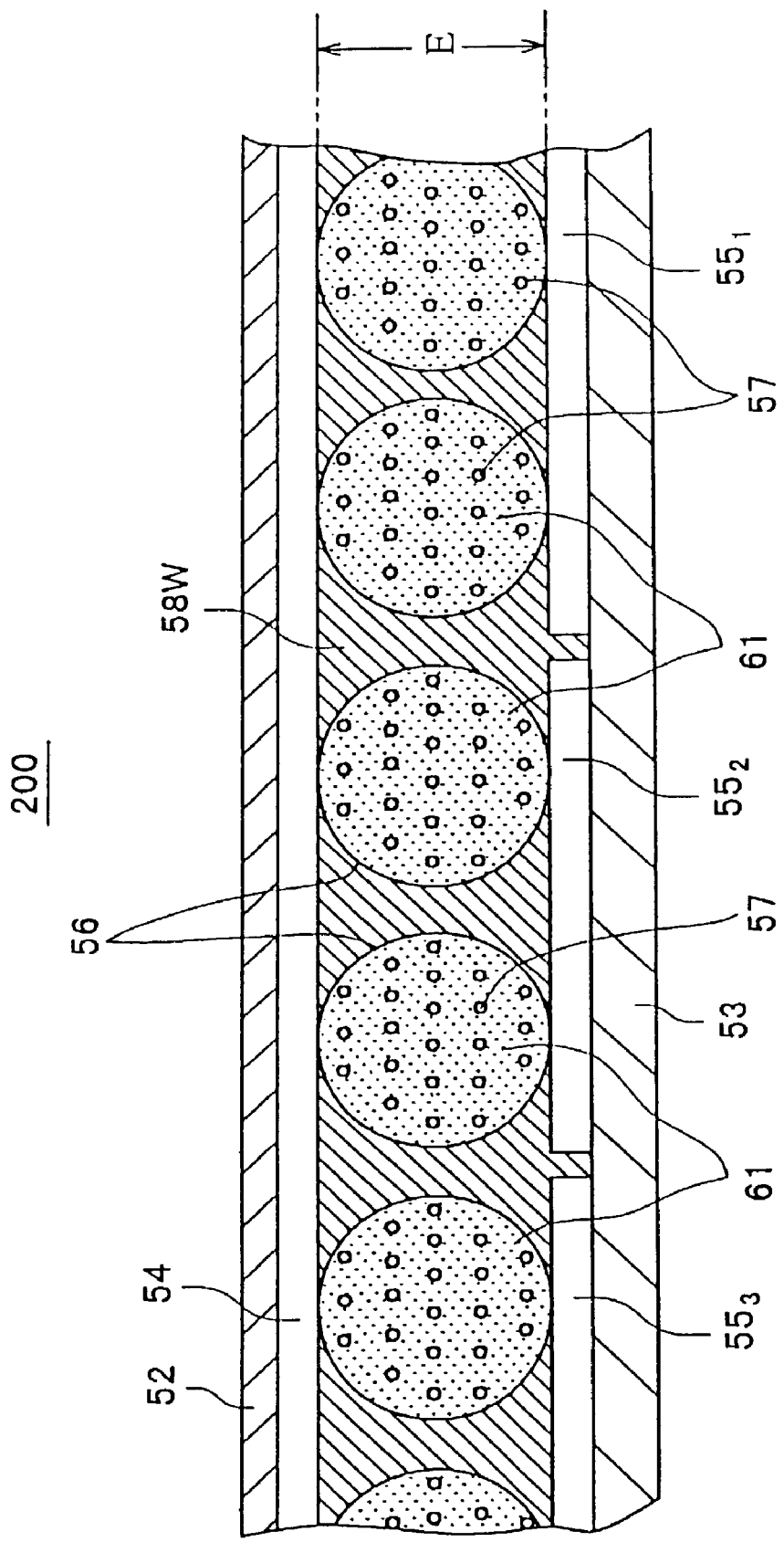

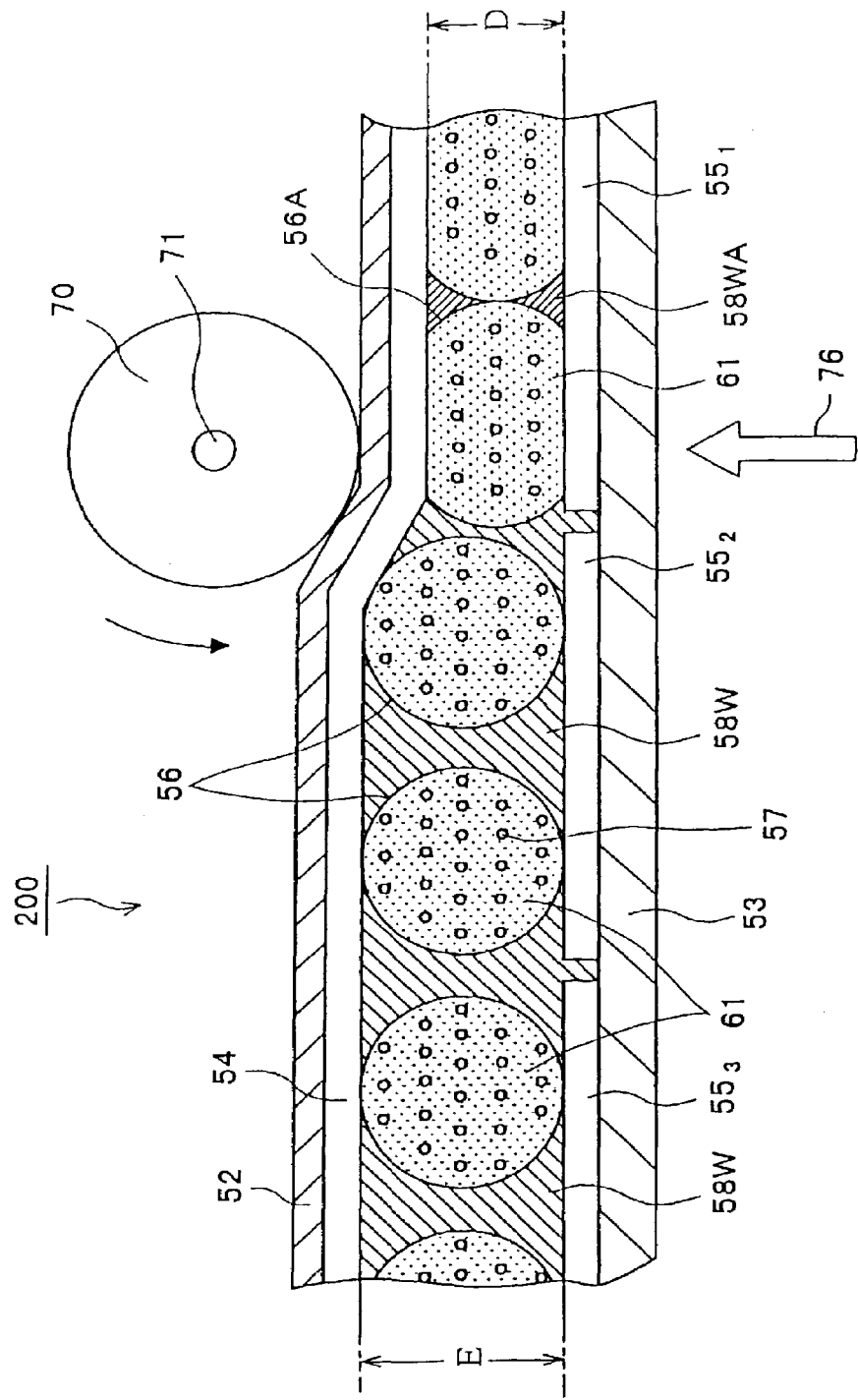

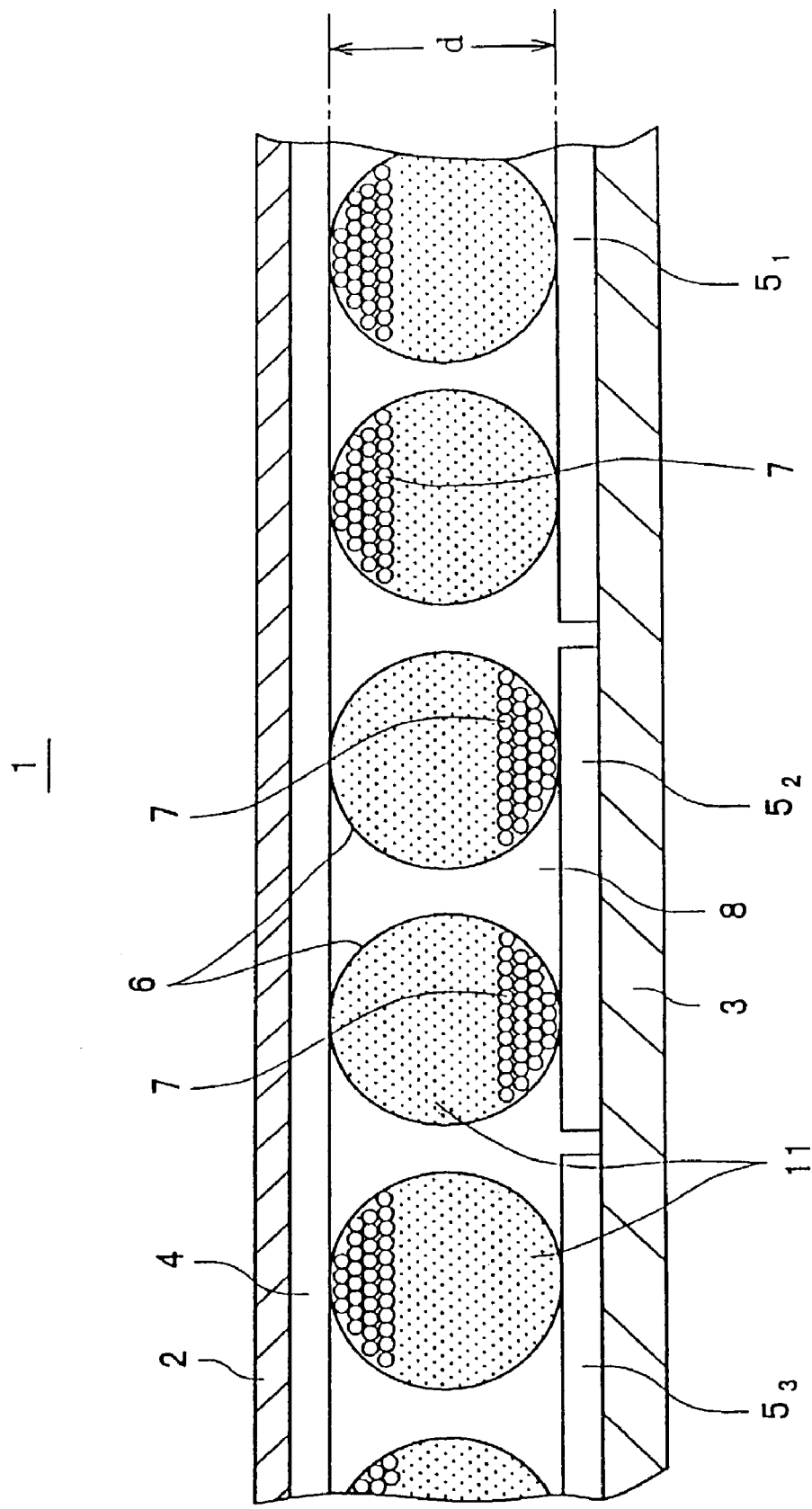

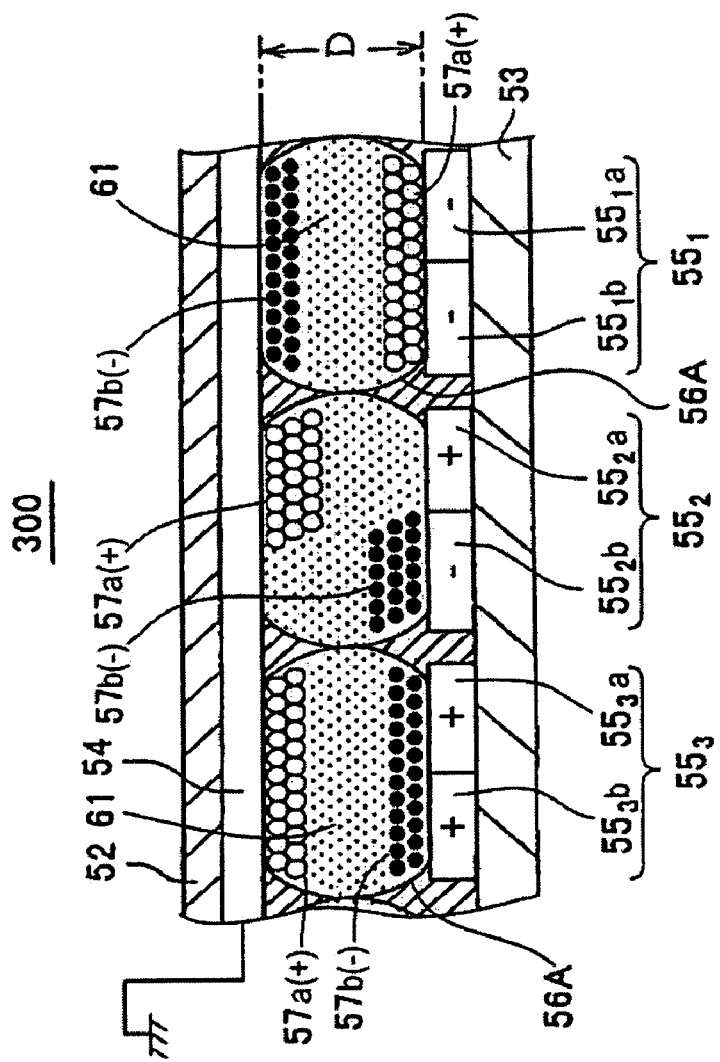

ELECTROPHORETIC DISPLAY AND METHOD OF PRODUCING THE SAME

This is a Continuation-in-Part of application Ser. No. 09/674,679 filed Nov. 3, 2000 now U.S. Pat. No. 6,597,340, which in turn is a National Stage Entry, which claims the benefit of PCT/JP00/01351 filed Mar. 6, 2000. The entire disclosure of the prior applications is hereby incorporated by reference herein in its entirety.

BACKGROUND OF THE INVENTION

1. Field of Invention

The present invention relates to an electrophoretic display which utilizes the movement of electrophoretic particles in a medium due to application of an electric field, and a method of producing the same.

2. Description of Related Art

Japanese Unexamined Patent Publication (Kokai) No. 64-86116 and Japanese Unexamined Patent Publication (Kokai) No. 10-149118 disclose inventions of electrophoretic displays using microcapsules.

FIG. 7 is an elementary sectional view for illustrating an example of a conventional electrophoretic display using microcapsules.

In the electrophoretic display 1, a transparent substrate 3 provided with transparent electrodes $5_1$ to $5_3$ and a transparent back substrate 2 having a transparent electrode 4 are arranged at a predetermined distance d so that the transparent electrode 4 and the transparent electrodes $5_1$ to $5_3$ face each other.

The transparent substrate 3 and the back substrate 2 are formed by using an insulating synthetic resin such as PET (polyethylene terephthalate).

The transparent electrode 4 and the transparent electrodes $5_1$ to $5_3$ are formed by, for example, transparent electrode films (ITO (indium oxide) films).

A large number of microcapsules 6 are arranged between the transparent substrate 3 and the back substrate 2.

The microcapsules 6 are sealed with (comprise) a dispersion comprised of electrophoretic particles 7 dispersed in a dispersion medium 11 (dispersion system) in advance by the microcapsulation technique. In natural state, these shapes are spherical.

The electrophoretic particles 7 are comprised of charge particles, for example, white pigment.

The dispersion medium 11 is comprised of a colored dispersion medium, for example, colored black.

Hereinafter, the liquid mixture between the electrophoretic particles 7 and dispersion medium 11 sealed in the microcapsules 6 will also be referred to as the electrophoretic display dispersion.

Between the transparent substrate 3 and the back substrate 2, the large number of microcapsules 6 and a binder 8 for fixing the large number of microcapsules 6 are inserted.

The binder 8 is transparent and has good bondability with the transparent electrodes 4 and $5_1$ to $5_3$.

In this configuration, for example, when making the transparent electrode 4 the ground potential and applying a negative voltage to the transparent electrodes $5_1$ and $5_3$, electrophoretic particles 7, that is, the charged particles, inside the microcapsules 6 between the transparent electrode 4 and the transparent electrodes $5_1$ and $5_3$ move toward the transparent electrode 4. As a result, the microcapsules 6 between the transparent electrode 4 and the transparent electrodes $5_1$ and $5_3$ exhibit a black color with respect to the direction of the transparent substrate 3.

Further, if making the transparent electrode 4 the ground potential and applying a positive voltage to the transparent electrode $5_2$, electrophoretic particles 7, that is, the charged particles inside the microcapsules 6 between the transparent electrode 4 and the transparent electrode $5_2$ move toward the transparent electrode $5_2$. As a result, the microcapsules 6 between the transparent electrode 4 and the transparent electrode $5_2$ exhibit a white color with respect to the direction of the transparent substrate 3.

An electrophoretic display having spherical microcapsules seal with an electrophoretic display dispersion, suffers from the following disadvantages (1) and (2).

(1) The portions between the spherical microcapsules, that is, the binder portions, do not contain electrophoretic particles, so the contrast may be liable to be lowered.

(2) The electric field intensity acting on the electrophoretic display dispersion in the spherical microcapsules positioned between the electrodes becomes nonuniform, so localization of the electrophoretic particles may be liable to be caused.

Japanese Unexamined Patent Publication (Kokai) No. 10-149118 discloses making the dielectric constant the same between the electrophoretic display dispersion and binder to make the electric field intensity uniform, but if this is done, limits arise in the selection of the materials used for the electrophoretic display dispersion and binder.

SUMMARY OF THE INVENTION

An object of the present invention is to provide the electrophoretic display which is capable of improving the contrast, and a method of producing the same.

The electrophoretic display according to the present invention comprises a first substrate comprising a transparent substrate on one surface of which a transparent electrode comprising a first electrode is formed and the other surface of which forms a display surface; a second substrate on one surface of which a second electrode is formed and arranged in parallel with the first substrate so that the second electrode faces the first electrode; and a plurality of microcapsules containing a dispersion comprising a liquid phase dispersion medium and electrophoretic particles, arranged between the first and second electrodes so as to contact each electrode, and formed in a flat shape along the first electrode at least at the first electrode side.

According to the present invention, preferably the plurality of microcapsules are also formed flat along the second electrode at the second electrode side.

The method of production of an electrophoretic display having a plurality of microcapsules containing a dispersion comprising a liquid phase dispersion medium and electrophoretic particles, a first substrate comprised of a transparent substrate provided with a first electrode comprised of a transparent electrode, and a second substrate provided with a second electrode, according to the present invention comprises comprising the steps of housing the plurality of microcapsules and a liquid binder between the first and second substrates so that the plurality of microcapsules face the first and second electrodes via the binder; applying pressure to the first or second substrate to flatten the microcapsules between the substrates; and causing the binder near the microcapsules flattened by the pressure to cure so as to fix the flattened microcapsules to at least the first substrate.

In the method of production of an electrophoretic display according to the present invention, the binder is a photocuring or heat curing binder and the method further comprises applying light or heat corresponding to the binder near the microcapsules flattened by the pressure to cause the binder to cure.

In the electrophoretic display according to the present invention, by flattening the display surface side of the plurality of microcapsules, it is possible to reduce the portion between microcapsules and possible to reduce the distance between substrates compared with when the microcapsules between the substrates are spherical.

In the method of production of an electrophoretic display according to the present invention, by applying pressure to the first or second substrate to flatten the microcapsules and causing the binder near the flattened microcapsules to cure, it is possible to hold the flat shape of the microcapsules and possible to reduce the distance between substrates compared with when the microcapsules between the substrates are spherical.

BRIEF DESCRIPTION OF THE DRAWINGS

FIG. 1 is a principal sectional view for explaining a first embodiment of an electrophoretic display according to the present invention.

FIG. 2 is an explanatory view of a method of production of the electrophoretic display in FIG. 1.

FIG. 3 is an explanatory diagram of the method of production of the electrophoretic display of FIG. 1 following FIG. 2.

FIG. 4 is a principal sectional view for explaining a second embodiment of an electrophoretic display according to the present invention.

FIG. 5 is an explanatory view of the method of production of the electrophoretic display of FIG. 4.

FIG. 6 is an explanatory diagram of the method of production of the electrophoretic display of FIG. 4 following FIG. 5.

FIG. 7 is a principal sectional view for explaining an example of a conventional electrophoretic display.

FIG. 8 is an elementary and partial sectional view of a third embodiment of an electrophoretic display according to the present invention.

DETAILED DESCRIPTION OF PREFERRED EMBODIMENTS

Below, embodiments of the present invention will be explained referring to the appended drawings.

First Embodiment

FIG. 1 is a principal sectional view for explaining a first embodiment of an electrophoretic display according to the present invention.

This electrophoretic display 150 is comprised of a back substrate 52 provided with a transparent electrode 54 and a transparent substrate 53 provided with a plurality of transparent electrodes $55_1$ to $55_n$ arranged at a predetermined distance D so that the transparent electrode 54 and the transparent electrodes $55_1$ to $55_n$ face each other.

Note that, in FIG. 1, only the three transparent electrodes $55_1$ to $55_3$ among the plurality of transparent electrodes $55_1$ to $55_n$ are illustrated.

The back substrate 52 is formed using an insulating synthetic resin.

The transparent substrate 53 is formed using an insulating synthetic resin such as PET.

The transparent electrode 54 and the transparent electrodes $55_1$ to $55_n$ are formed by ITO films or other transparent electrode films.

Between the transparent substrate 53 and the back substrate 52 are provided the large number of microcapsules 56A. The microcapsules 56A are flat in shape. The display surface side comprised of the transparent substrate 53 side and the back side comprised of the back substrate 52 side thereof are parallel.

The microcapsules 56A are individually sealed with (comprise) a dispersion comprised of electrophoretic particles 57 dispersed in a dispersion medium 61 (dispersion system) in advance by the microcapsulation technique. Pressure is applied to the spherical microcapsules to flatten them.

The electrophoretic particles 57 are comprised of for example white pigment or other charged particles.

The dispersion medium 61 is comprised of a colored dispersion medium colored for example black.

Hereinafter, the liquid mixture of the electrophoretic particles 57 and the dispersion medium 61 sealed in the microcapsules 56A is referred to as an electrophoretic display dispersion.

Between the transparent substrate 53 and the back substrate 52 are filled the large number of microcapsules 56A and a solid binder 58LA for fixing the large number of microcapsules 56A.

As the binder 58LA, a photocuring resin or other photocuring binder is used.

The microcapsules 56A preferably have flexibility.

Materials having flexibility as microcapsules 56A include arabic-rubber-gelatin based compounds or urethane-based compounds.

The urethane-based compounds have basic compositions of the following chemical formula. By selecting the substituent R1 or R2 in the formula, any flexibility may be obtained.

In the following chemical formula, a urethane-based compound is produced from isocyanate and alcohol:

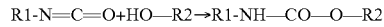

R1-N=C=O+HO—R2→R1-NH—CO—O—R2

Also, the microcapsules 56A preferably have a size which is uniform or substantially uniform.

For the microcapsules with substantially equal size, for example, it is possible to use filtration or classification by specific gravity to obtain microcapsules of a diameter of about 40 to 60 μm.

In such a configuration, for example, if the transparent electrode 54 is made the ground potential and a negative voltage is applied to the transparent electrodes $55_1$ to $55_3$, the charged particles, that is, electrophoretic particles 57, inside the microcapsules 6 between the transparent electrode 54 and transparent electrodes $55_1$ to $55_3$ move toward the transparent electrode 54. As a result, the microcapsules 6 exhibit a black color toward the direction of the transparent substrate 53.

Next, the method of production of the electrophoretic display according to the first embodiment will be explained.

FIG. 2 and FIG. 3 are views for explaining the method of production of the electrophoretic display according to the first embodiment and show a principal sectional view of the electrophoretic display.

The electrophoretic display 100 is produced through the following steps 1 to 5.

Step 1: The transparent electrode 54 is formed on a flexible back substrate 52. Also, transparent electrodes $55_1$ to $55_n$ are formed on the transparent substrate 53. Separately, the large number of microcapsules sealed with (comprise) a liquid mixture of electrophoretic particles 57 and the dispersion medium 61 are formed.

Step 2: The liquid binder 58L is coated on the transparent substrate 53 formed with the transparent electrodes $55_1$ to $55_n$.

Step 3: Spherical microcapsules 56 with substantially equal sizes are arranged on the transparent substrate 53 coated with the liquid binder 58L.

Step 4: The back substrate 52 and the transparent substrate 53 are arranged at a predetermined distance E so that the transparent electrode 54 and the transparent electrodes $55_1$ to $55_n$ face each other. The microcapsules 56 and liquid binder 58L are housed between the back substrate 52 and the transparent substrate 53.

An amount of the binder 58L required for filling the gaps between the microcapsules at the time of the final shaping of the electrophoretic display is coated on the surface of the transparent substrate 53.

Step 5: As shown in FIG. 3, a pressure roller 70 is brought into contact with an outer surface of the back substrate 52 of the electrophoretic display 100, pressure is applied, and the pressure roller 70 is made to relatively move, whereby the spherical microcapsules 56 are successively made to deform to flat-shaped microcapsules 56A.

At this time, the liquid binder 58L moves so as to fill the gaps between the microcapsules.

The liquid binder 58L near the microcapsules flattened by the pressure from the pressure roller 70 is irradiated with slit light 75 via the transparent substrate 53 so as to cause the liquid binder 58L to cure by the slit light 75 and form a solid.

By curing the liquid binder 58L to make the solid binder 58LA, the microcapsules 56A are fixed to the transparent substrate 53 and the back substrate 52 and held in the flat shape and the transparent substrate 53 and the back substrate 52 are bonded to each other by the binder 58LA to hold a predetermined distance D (<E).

In this way, the liquid binder 58L is lightly coated first and then the liquid binder 58L is made to cure while using pressure to flatten the microcapsules.

The relative movement between the pressure roller 70 and slit light 75 and the electrophoretic display 100 may be one making the direction of irradiation of the slit light 75 the direction of a roller shaft 71, fixing the electrophoretic display 100 in place, and making the pressure roller 70 and output device of the slit light 75 (not shown) move or may be one making the pressure roller 70 rotate at a constant position and making the electrophoretic display 100 move.

It is also possible to use two pressure rollers to grip the electrophoretic display 100 and press the electrophoretic display 100 from the display surface side and the back side.

As described above, it is also possible to use the pressure roller 70, slit light 75, and photocuring binder 58L to obtain the electrophoretic display 150 according to the first embodiment.

Note that in the electrophoretic display 100 shown in FIG. 2, the binder 58L is coated on the transparent substrate 53, but when producing the electrophoretic display 150, it is also possible to make the back substrate 52 a transparent material and coat the liquid binder 58L on the back substrate 52 and to irradiate slit light 75 from the back substrate 52 side or from the back substrate 52 side and transparent substrate 53 side.

Further, in the electrophoretic display 100 of FIG. 2, it is also possible to provide holes in the transparent substrate 53 or the back substrate 52 in advance so that excess materials other than the microcapsules 56 and binder 58L in the materials positioned between the transparent substrate 53 and the back substrate 52 are ejected at the time of pressure and to close the holes after curing of the liquid binder 58L.

Further, the excess materials may be made to be ejected at the time of pressure from the edges of the transparent substrate 53 or the back substrate 52 and the microcapsules 56A and binder 58LA sealed between the substrates 52 and 53 after the curing of the liquid binder 58L.

Second Embodiment

FIG. 4 is a principal sectional view for explaining a second embodiment of an electrophoretic display according to the present invention.

The electrophoretic display 250 is configured substantially the same as the electrophoretic display 150 according to the first embodiment, but the binder and the method of production differ.

In the electrophoretic display 250, parts the same as those of the electrophoretic display 150 shown in FIG. 1 are assigned the same reference numerals. Explanations of the same portions are omitted.

The transparent substrate 53 and the back substrate 52 are filled with the large number of flat-shaped microcapsules 56A and the solid binder 58WA for fixing the large number of microcapsules 56A.

As the binder 58WA, a water-soluble silicone resin or other photocuring material or heat curing urethane-based compound may be used.

Next, a method of production of the electrophoretic display according to the second embodiment will be explained.

FIG. 5 and FIG. 6 are explanatory views of the method of production of the electrophoretic display according to the second embodiment and show a principal sectional view of the electrophoretic display.

In the electrophoretic display 200 of FIG. 5, the binder 58W is liquid and is present in the state of an aqueous solution between the transparent substrate 53 and the back substrate 52.

The silicone resin and water in the liquid binder 58W are mixed in consideration of the desired flatness of the microcapsules, that is, the volume of the gaps between the microcapsules, so that the silicone resin will fill the gaps between the flattened microcapsules 56A.

In FIG. 6, the pressure roller 70 is brought into contact with the outer surface of the back substrate 52 of the electrophoretic display 200 and pressure is applied. The spherical microcapsules 56 are successively deformed to flat type microcapsules 56A by the pressure roller 70.

The liquid binder 58W near the microcapsules 56A flattened by this pressure is stripped of the moisture in the liquid binder 58W by heat rays 76 irradiated via the transparent substrate 53 and thereby shrunken and cured.

By curing the liquid binder 58W to make the solid binder 58WA, the microcapsules 56A are fixed to the transparent substrate 53 and the back substrate 52 and held in flat shape and the transparent substrate 53 and the back substrate 52 are bonded together by the binder 58WA and hold the predetermined distance D (<E).

In this way, the liquid binder 58W is used and heated to cause the moisture to evaporate off and thereby cause the heat curing binder 58W to shrink and cure while using pressure to make the microcapsules flat.

The relative movement of the pressure roller 70 and heat rays 76 with the electrophoretic display 200 may be one making the direction of irradiation of the heat rays 76 the direction of the roller shaft 71, fixing the electrophoretic display 200, and making the pressure roller 70 and the output device of the heat rays 76 (not shown) move or one making the pressure roller 70 rotate at a constant position and making the electrophoretic display 200 move.

It is also possible to use two pressure rollers to grip the electrophoretic display 200 and press the electrophoretic display 200 from the display surface side and the back side.

As described above, it is also possible to use the pressure roller 70, heat rays 76, and heat curing binder 58L to obtain the electrophoretic display 250 according to the second embodiment.

Note that in the electrophoretic display 200 shown in FIG. 5, it is also possible to provide holes in the transparent substrate 53 or the back substrate 52 in advance so that the moisture in the liquid binder 58W are ejected at the time of pressure or heating and to close the holes after curing of the liquid binder 58W.

Further, the moisture may be made to be ejected at the time of pressure or heating from the edges of the transparent substrate 53 or the back substrate 52 and the microcapsules 56A and binder 58WA sealed between the substrates 52 and 53 after the curing of the liquid binder 58W.

Further, it is possible to use a heat shrinking material as the binder 58W and making the liquid binder 58W shrink and cure by heating while using the pressure roller 70 to flatten the microcapsules 56.

In the embodiments, the transparent electrode of the transparent substrate 53 may be made an ITO film by sputtering. Also, it is possible to make the back electrode of the back substrate 52 a copper foil and irradiate slit light or heat rays from the transparent substrate 53 side.

It is also possible to interpose spacers between the substrates so as to maintain the distance between the substrates at a constant distance at the time of the final shaping of the electrophoretic display. The spacers may be made of a photocuring or heat curing material.

In the electrophoretic display according to the above embodiment, since at least the display surface side of the microcapsules is flattened, it is possible to reduce the gaps between the microcapsules where the binder is present at the display surface side compared with when the microcapsules between the substrates are spherical and therefore possible to increase the change of contrast.

Also, since at least the display surface side of the microcapsules is flattened, it is possible to reduce the distance between substrates compared with when the microcapsules between the substrates are spherical and therefore possible to reduce the difference of application voltage between electrodes and possible to make the electrophoretic display 150, 250 thinner.

Further, since the microcapsules are sandwiched between the transparent substrate 53 and the back substrate 52 and the display surface side and the back side are flattened, the electric field intensity acting on the electrophoretic display dispersion can be made substantially uniform and localization of electrophoretic particles can be suppressed.

Further, by making the display surface side and the back side of the microcapsules flat, it is possible to further reduce the gaps between microcapsules where the binder is present and bring the structure of the electrophoretic display close to that of a cell type structure and possible to improve the contrast.

Further, by reducing the distance between substrates, it is possible to improve the response compared with before reducing the distance between substrates.

For example, the movement speed v of the electrophoretic particles is believed to be substantially proportional to the electric field intensity Ein. This is expressed as following using the proportional constant k.

$$v = k \cdot Ein \quad (1)$$

Further, the time T required for electrophoretic particles to move from one electrode to another electrode (response time) is expressed as following using the distance between electrodes (distance between substrates) A.

$$T = A/v \quad (2)$$

The electric field intensity Ein can be found by dividing the application voltage (potential difference between electrodes) Vin by the distance between electrodes A and is expressed by the following.

$$Ein = Vin/A \quad (3)$$

By deleting the movement speed v and electric field intensity Ein from the above (1) to (3), the response time T is expressed as the following.

$$T = A^2/(k \cdot Vin) \quad (4)$$

According to the above equation (4), the response time T is proportional to the square of the distance between electrodes A and is inversely proportional to the application voltage Vin.

According to the above equation (4), when, as one example, microcapsules with a diameter of 50 μm arranged at the maximum density form regular hexagonal columnar flat shapes with unchanged volumes, the height of the regular hexagonal columns becomes about 30 μm. In this case, the distance between electrodes A becomes about 60%, the response time T becomes about 36%, and the display can be switched in about ⅓ of the time.

Also, when it is not necessary to reduce the response time T, it is possible to reduce the application voltage to about ⅓ and thereby possible to obtain the effects of simplification of the display drive circuit, reduction of cost, and prevention of heat buildup.

Third Embodiment

FIG. 8 is an elementary and partial sectional view of a third embodiment of an electrophoretic display according to the present invention.

The electrophoretic display 300 shown in FIG. 8 has a structure similar to that of the electrophoretic display 150 shown in FIG. 1, however, in the electrophoretic display 300, each of transparent electrodes $55_1'$ to $55_3'$ has two separate transparent sub-electrodes $55_1a$ and $55_1b$, $55_2a$ and $55_2b$, and $55_3a$ and $55_3b$ which may be independently applied different polarities of voltages, and each microcapsule 56A includes two types of electrophoretic particles 57a and 57b, having different charging polarities, i.e., + or −, and different color characteristics such as color, hue, etc.

In this embodiment, first electrophoretic particles 57a are formed by titanium oxide such as titanium white and are charged at a positive (+) polarity, illustrated by small white circles, and second electrophoretic particles 57b are formed by carbon black and charged at a negative (−) polarity, illustrated by small black circles.

The dispersion medium 61 included in each microcapsule 56A together with the first and second electrophoretic particles 57a and 57b has color and/or hue different than that of the first and second electrophoretic particles 57a and 57b.

Each microcapsule 56A has flexibility and has a particle flat sectional shape by performing the process described with reference to FIG. 2 to FIG. 3.

An exemplary operation of the above-described structure is described below.

The transparent electrode 54 is applied with the ground potential, 0V. In case of (c) in FIG. 8, when a positive (+) voltage is applied to both separate transparent sub-electrodes $55_3a$ and $55_3b$, the second electrophoretic particles $57b$ which are charged at a negative (−) polarity, are moved and attached to the transparent sub-electrodes $55_3a$ and $55_3b$, and the first electrophoretic particles $57a$ which are charged at a positive (+) polarity, are moved to the transparent electrode 54. As a result, the microcapsule 56A exhibits a color of that of the first electrophoretic particles $57b$, for example, a black color, with respect to the direction of the substrate 53.

In case of (a) in FIG. 8, when a negative (−) voltage is applied to both separate transparent sub-electrodes $55_1a$ and $55_1b$, contrary to case (c), the first electrophoretic particles $57a$ are moved and attached to the transparent sub-electrodes $55_1a$ and $55_1b$, and the second electrophoretic particles $57b$ are moved and attached to the transparent electrodes 54. As a result, the microcapsule 56A exhibits a color of that of the second electrophoretic particles $57b$, for example, a white color, with respect to the direction of the substrate 53.

In case of (b) in FIG. 8, when a positive (+) voltage is applied to the transparent sub-electrode $55_2a$ and a negative (−) voltage is applied to the transparent sub-electrode $55_2b$, the first electrophoretic particles $57a$ are moved and attached to the transparent electrodes 54 and the second electrophoretic particles $57b$ are moved and attached to the transparent sub-electrode $55_2b$. As a result, the microcapsule 56A exhibits an intermediate color mixed with the colors of the first and second electrophoretic particles $57a$ and $57b$, for example, a gray color, with respect to the direction of the substrate 53.

As discussed above, the electrophoretic display 300 can provide three kinds of colors in cases (a) to (c).

In the electrophoretic display 300, of course, the microcapsule 56A is deformed in a flat shape and positioned at the adjacent transparent sub-electrodes, for example, $55_1a$ and $55_1b$, therefore, the particles in each microcapsule 56A are evenly deposited over a plurality of the transparent sub-electrodes $55_1a$ and $55_1b$ to $55_3a$ and $55_3b$, and a high and constant contrast is achieved.

The production of the electrophoretic display 300 is substantially equal to that of the electrophoretic displays 150 and 250 shown in FIGS. 1 and 4, except for production of the microcapsule 56A including the first and second electrophoretic particles $57a$ and $57b$, and production of the separate transparent sub-electrodes, for example, $55_1a$ and $55_1b$.

INDUSTRIAL APPLICABILITY

In the electrophoretic display according to the present invention, by flattening the display surface side of the plurality of microcapsules, it is possible to reduce the gaps between microcapsules and improve the contrast and possible to improve the quality.

Further, it is possible to make the electrophoretic display thinner.

Further, with an electrophoretic display according to the present invention, since the display surface side and the back side of the plurality of microcapsules are flattened, the electric field intensity acting on the electrophoretic display dispersion can be made uniform, localization of the electrophoretic particles can be suppressed, and the quality can be further improved.

According to the method of production of an electrophoretic display according to the present invention, it is possible to produce an electrophoretic display where at least the display surface side of the plurality of microcapsules is flattened and possible to obtain a thin electrophoretic display with improved contrast.

What is claimed is:

1. An electrophoretic display, comprising:
    a first substrate comprising a first electrode;
    a second substrate comprising a second electrode arranged in parallel with said first electrode, at least one of the first substrate and the second substrate being provided with holes; and
    microcapsules each containing a dispersion comprising a liquid phase dispersion medium and electrophoretic particles, arranged in a single layer between said first and second electrodes so as to contact each electrode, and deformed in a flat shape along said first electrode at least at said first electrode side; and
    binder filled in a gap between adjoining microcapsules and contacted with the first and second electrodes;
    wherein the microcapsules are formed in a flat shape along said second electrode at said second electrode side, a first length of the microcapsules in a first direction being shorter than a second length of the microcapsules in a second direction perpendicular to the first direction, and the binder closing the holes in the at least one of the first substrate and the second substrate.

2. An electrophoretic display of claim 1, wherein the electrophoretic particles comprise a first particle, and a second particle providing a color different to that of the first particle.

3. An electrophoretic display of claim 2, wherein the liquid phase dispersion medium has transparency.

4. An electrophoretic display of claim 1, wherein the electrophoretic particles comprise first and second particles, one of which is positively charged with electricity and the other of which is negatively charged.

5. An electrophoretic display of claim 1, wherein the electrode of one of the first and the second substrates is divided into a plurality of parts, voltages are independently applied to each part, and one of the microcapsules is positioned between the parts.

6. An electrophoretic display of claim 5, wherein one of the microcapsules is in contact with each of the parts and has a flat shape at the interface with each of the parts.

7. A method of producing an electrophoretic display having microcapsules containing a dispersion comprising a liquid phase dispersion medium and at least one kind of electrophoretic particle, a first substrate comprising a first electrode, and a second substrate comprising a second electrode, each of said microcapsules being formed in a flat shape along said second electrode at said second electrode side, the method including:
    providing a single layer of the microcapsules and a liquid binder between said first and second substrates to fill said liquid binder in a space between adjoining microcapsules and the first electrode and in a space between adjoining microcapsules and the second electrode so that the single layer of microcapsules faces said first and second electrodes via said binder;

pressing a roller along one of said first or second substrate to flatten said microcapsules between said substrates to thereby have a first length of the microcapsules in a first direction perpendicular to the first and second electrodes and a second length of the microcapsules in a second direction perpendicular to the first direction, the first length being shorter than the second length; and curing the binder either by irradiating the binder with light or heating the binder so as to fix said flattened microcapsules to at least said first substrate, the step of curing being performed simultaneously with the step of pressing the roller along the one of said first or second substrate, wherein light or heat from the step of curing is applied at a location on another of said first or second substrate, which is directly opposite to a location of the roller on the one of said first or second substrate.

* * * * *